3,366,691
PREPARATION OF DIHYDROXYBENZOPHENONES

Richard T. Keller, Baton Rouge, La., assignor to The Dow Chemical Company, Midland, Mich., a corporation of Delaware
No Drawing. Filed Jan. 28, 1966, Ser. No. 523,531
4 Claims. (Cl. 260—591)

This invention relates to the preparation of diphenoxybenzophenones and dihydroxybenzophenones from phenyl ether.

The process of the invention may be characterized by the following reaction sequence:

(I)

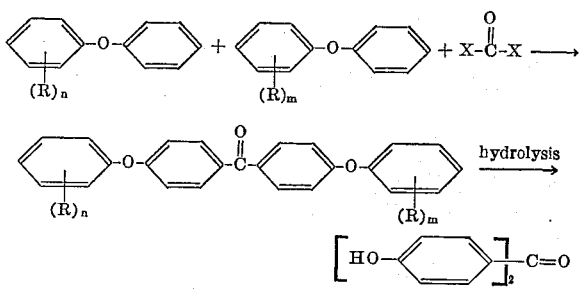

wherein each X (which may be the same or different) represents bromine or chlorine, $n$ and $m$ are each independently integers of from 0 to 5 (preferably 0–1) which represent the number of substituents on the indicated benzene ring, and R is any stable monovalent ring substituent. Unsubstituted ring carbon atoms are bonded to hydrogen atoms. Suitable R groups include alkyl groups of up to 4 carbon atoms (methyl, ethyl, n-propyl, i-propyl, n-butyl, i-butyl, sec.-butyl, tert.-butyl) as well as stable inorganic substituent groups such as the halogens (especially bromine, chlorine and fluorine).

Reaction 1 is carried out in the presence of a Friedel-Crafts catalyst such as $AlCl_3$, $AlBr_3$, $GaCl_3$, $GaBr_3$ or $CH_3CH_2AlCl_2$, at a temperature of up to about 200° C. (preferably from about 25° to 125° C.). Reaction temperatures of from about 0° C. to 200° C. are suitable. The reaction may be conducted at any pressure of from a few millimeters of mercury up to several hundred atmospheres, depending upon the particular reaction temperature used. The hydrolysis reaction 2 is carried out at temperatures of from about 250° to 400° C. In a typical hydrolysis reaction, a base such as an alkali metal hydroxide, alkaline earth metal hydroxide or other suitable base is added to the product obtained from reaction 1, either in situ or after separation. The resulting basic mixture is then heated to about 250° to 400° C. preferably 290° to 320° C. employing pressures of up to about 2000 p.s.i.g. The reaction product is then neutralized and the hydrolysis product separated.

In a particularly advantageous embodiment of the invention, phenyl ether is first reacted with phosgene in the presence of $AlCl_3$ to produce 4,4'-diphenoxybenzophenone. The 4,4'-diphenoxybenzophenone is then hydrolyzed with aqueous sodium hydroxide at a temperature of from 250° to 400° C. (preferably 290° to 320° C.), neutralized with a mineral acid, and the resulting 4,4'-dihydroxybenzophenone separated from the phenol produced as a by-product of the hydrolysis reaction. No tars are formed according to this process for preparing 4,4'-dihydroxybenzophenone. In addition, the yields of 4,4'-dihydroxybenzophenone obtained in the hydrolysis step are almost quantitative.

The dihydroxybenzophenones produced according to the invention are of high purity and may be used as additives to improve the high temperature characteristics of synthetic aromatic polyester lubricants and to prepare thermally stable polycarbonate or epoxy resins.

The following examples are submitted for the purpose of illustration only and are not to be construed as limiting the scope of the invention in any way.

EXAMPLE I

Preparation of 4,4'-diphenoxybenzophenone

A sample of 480 milliliters (3 moles) phenyl ether and 74 grams (0.55 mole) of aluminum chloride was placed in a 2 liter stainless steel reactor equipped with a condenser (cooled with solid $CO_2$), means for temperature control and a pressure gage. Phosgene (50 grams; 0.50 mole) was transferred to the reactor by distillation. The reactor was heated to 80° C. and the pressure was kept at about 45 p.s.i.g. by venting the HCl produced by the reaction through the condenser which is cooled with solid carbon dioxide. The reactor was held at 80° C. for 3 hours, vented and cooled. The aluminum chloride complex was quite soluble in phenyl ether at 25° C., but after stirring with 4 percent aqueous HCl, the mixture was warmed to avoid precipitation of product. The warm organic layer was water washed and the 4,4'-diphenoxybenzophenone recrystallized from 1 liter of methyl chloroform with charcoal decolorization. The yield of 4,4'-diphenoxybenzophenone was 157 grams (86 percent of theory); melting point 146°–147° C. The mother liquors were distilled yielding an additional 34 grams of crude 4,4'-diphenoxybenzophenone as a residue.

At atmospheric pressure, increased temperature in the range of 25°–125° C. did not appreciably increase the effective rate of reaction, since the concentration of phosgene in the liquid phase was reduced correspondingly. Moderate pressure in combination with increased temperature was effective in increasing the rate.

EXAMPLE II

Hydrolysis of 4,4'-diphenoxybenzophenone to 4,4'-dihydroxybenzophenone

The hydrolysis reaction was carried out in a pressure vessel. A mixture of 107 grams (0.292 mole) of 4,4'-diphenoxybenzophenone from Example I and 280 grams of 16.7 percent (weight) aqueous sodium hydroxide (1.17 moles) was heated at 300° C. for 30 minutes. Unreacted 4,4'-diphenoxybenzophenone was separated by filtration. The reaction products formed were acidified with aqueous HCl to pH 2. The precipitated 4,4'-dihydroxybenzophenone was separated by filtration. The precipitate was washed with water and dried to yield 33 grams of 4,4'-dihydroxybenzophenone based upon the reaction of 54 grams of 4,4'-diphenoxybenzophenone.

EXAMPLE III

Into a 500 milliliter, 3-necked flask equipped with a stirrer, a condenser (cooled with solid $CO_2$), means for temperature control, and gas inlet tube, was placed a 100 milliliter sample of o-dichlorobenzene solvent, a 20.7 gram (0.11 mole) sample of p-methylphenyl phenyl ether and an 8.1 gram (0.0605 mole) sample of anhydrous aluminum chloride. Phosgene (5.5 grams; 0.55 mole) was added over a 10 minute period at 25° to 30° C. HCl was slow to evolve so the reaction was heated to 45° C. and stirred for two hours. The reaction mixture was poured into dilute aqueous HCl. The organic phase was then separated and washed with water. Hexane was added to precipitate 4,4'-bis(4-methylphenoxy)benzophenone, 6.5 grams, M.P. 163°–165° C.

I claim as my invention:
1. A method of preparing 4,4'-dihydroxybenzophenone which comprises hydrolyzing in the presence of an alkali or an alkaline earth metal hydroxide a 4,4'-diphenoxybenzophenone at temperatures of 250° to 400° C.

2. The method of claim 1 wherein the diphenoxybenzophenone is a compound of the formula:

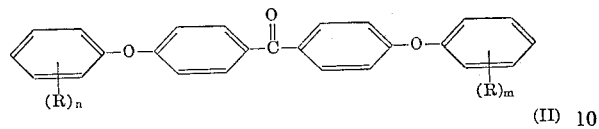

(II)

wherein:
(a) $n$ and $m$ are each independently integers of from 0 to 5;
(b) each R is independently selected from the group consisting of a halogen atom and a lower alkyl group; and
(c) each unsubstituted ring carbon atom of Formula II is bonded to a hydrogen atom.

3. The method of claim 2 wherein the hydrolysis is carried out in the presence of an alkali metal hydroxide.

4. The method of claim 3 wherein, in the formula of the compound, $n=0$ and $m=0$.

References Cited

UNITED STATES PATENTS 2,853,523  9/1958  Von Glahn et al. _____ 260—591

DANIEL D. HORWITZ, *Primary Examiner.*